United States Patent [19]
Fox

[11] 3,853,628
[45] Dec. 10, 1974

[54] FUEL CELL

[76] Inventor: John B. Fox, Rt. 2, Box 567, Elmira, Oreg. 97437

[22] Filed: July 26, 1973

[21] Appl. No.: 382,756

[52] U.S. Cl............................................... 136/86 D
[51] Int. Cl. ......................................... H01m 27/04
[58] Field of Search............................ 136/86, 121

[56] References Cited
UNITED STATES PATENTS

| | | | |
|---|---|---|---|
| 356,727 | 1/1887 | Perry .................................. | 136/121 |
| 791,635 | 6/1905 | Mann et al........................... | 136/121 |
| 2,924,634 | 2/1960 | Fischbach et al................. | 136/86 A |
| 3,385,780 | 5/1968 | Feng ................................. | 136/121 X |
| 3,445,294 | 5/1969 | Leonard............................ | 136/86 D |
| 3,477,878 | 11/1969 | Hughes et al. .................... | 136/86 R |

*Primary Examiner*—A. B. Curtis
*Attorney, Agent, or Firm*—James D. Givnan, Jr.

[57] ABSTRACT

A cell having a magnetic anode about which is retained metallic fuel particles with an electrolyte solution of iron II and iron III chlorides. Graphite cathodes with finned outer surfaces provide increased surface area and may be of perforate construction.

6 Claims, 4 Drawing Figures

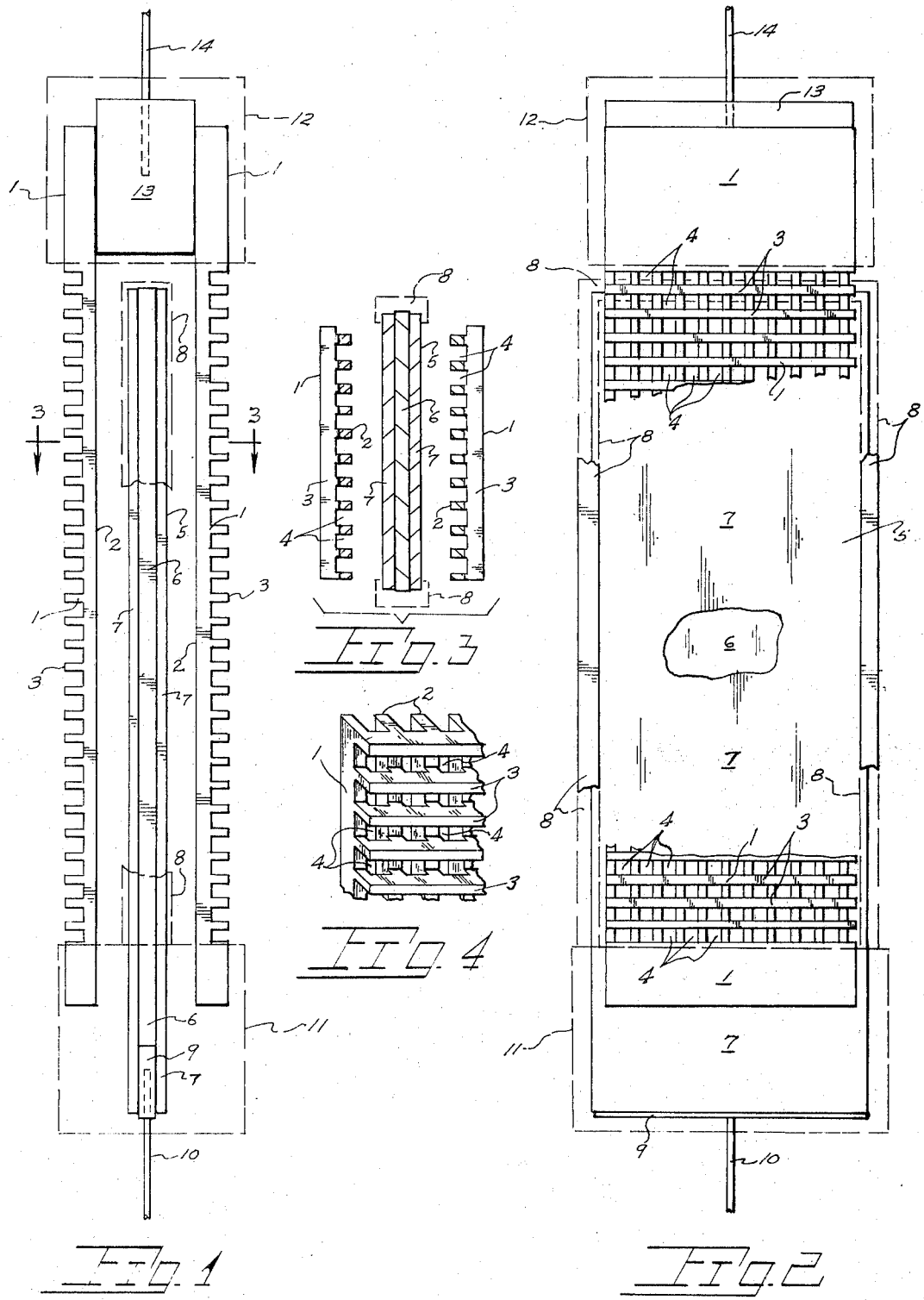

FUEL CELL

BACKGROUND OF THE INVENTION

The present invention concerns fuel cell construction utilizing readily available, low cost components assembled in a novel configuration to derive maximum efficiency.

The present fuel cell is directed toward overcoming the obstacle of high cost attendant other types of fuel cells. The structural components of the present cell and electrolyte are all readily available at a relatively low cost, are safe and relatively non-poisonous. The present fuel cell includes graphite electrodes having irregular wall surfaces to increase their efficiency. Additionally, openings in the electrodes facilitate electrolyte circulation therepast to minimize the effects of particle build up which if unchecked would eventually result in the cell becoming inoperative. The greatly increased surface area of the present cathode in conjunction with the openings therein facilitates the electron flow which is greatly in excess of what it would be without such features.

Additionally contributing to the highly practical nature of the present fuel cell is an anode of a magnetic nature shielded from the electrolyte by an inert conductor such as graphite. The magnetic core of the anode may be of a ceramic or plastic matrix with magnetic particles therein, the core being of elongate shape with the inert conductors superimposed therealong to shield same. Another anode useable in the present fuel cell is of a powdered graphite, magnetic oxide composition with a suitable binder.

BRIEF DESCRIPTION OF THE DRAWINGS

In the accompanying drawings:

FIG. 1 is an elevational view of the fuel cell structure sans electrolyte,

FIG. 2 is a view similar to FIG. 1 with the structure turned through 90° and with fragments broken away, FIG. 3 is a horizontal sectional view taken downwardly along line 3—3 of FIG. 1, and FIG. 4 is an isometric view of a fragment of a fuel cell cathode.

DESCRIPTION OF THE PREFERRED EMBODIMENTS

With continuing reference to the drawings wherein reference numerals are applied to parts of the fuel cell said parts being similarly identified by reference numeral in the following description.

The reference numeral 1 indicates cathodes of the present fuel cell. Each cathode is characterized by inner and outer irregular finned surfaces as at 2 and 3 whereby the surface area thereof is greatly increased over a comparable sized cathode having planar surfaces.

The irregular surfaces shown result from the formation of closely spaced fins which may be formed by a grooving operation. One suitable material from which the cathodes may be formed is electro graphite, Stackpole Carbon Co., grade 6077, which is of a density permitting precise cutting of the fins with each fin being of a thin sectional dimension. The fins so formed on surfaces 2 and 3 run in different directions with the combined depth of the relieved areas being greater than the cathode thickness. Interstices or openings 4 are thereby provided in the cathode.

Openings 4 further enhance cell efficiency with each cathod permitting passage of the electrolyte through same which is particularly important when particle build up has taken place on the anode. For example, were the cathodes surfaces planar, a particle build up on the anode would eventually restrict electrolyte flow intermediate cathode and anode. The present cathode construction permits electron via openings 4 from the outer surfaces 3 of the cathode. The openings 4 are of importance in that the outer finned surfaces 3 are in open communication with the fuel (iron particles) on the anode surface.

The anode at 5, best viewed in FIGS. 1 and 3 comprises a magnetic core 6 which may for example be of a ceramic or plastic strip material which serves as a matrix for permanently magnetized particles therein. Shielding the non-conductive magnetic core 6 are conductive strips 7 of graphite. Sealing the perimeter of the joined core 6 and strips 7 is an inert polyethylene base material 8 which serves additionally to hold the anode intact. The core 6 terminates at one end in abutment with a graphite block 9 within which a lead 10 is embedded. A quantity of polyethylene material at 11 retains the cathodes ends in the desired spaced relationship to the anode. Similarly the upper ends of the cathodes 1 terminate within a block 12 of inert polyethylene base material which serves to retain the cathodes against a graphite block 13 which receives an electrical lead 14.

One electrolyte found suitable for use with the present fuel cell structure includes iron particles dissolved in hydrochloric acid, with water present to dissolve the resulting salt, to form iron II chloride which upon being exposed to the atmospheric oxygen becomes an iron III chloride. As the duration of exposure lengthens the concentration of iron III salts increases with a color change occuring fromgreen to yellow indicating the proper proportion of iron III and iron II chlorides. No catalyst is necessary.

Preparation of the cell includes the forming of an iron particle collection on the anode surfaces which may be accomplished by immersing the cell in water to which has been added a quantity of suspended powdered iron. Alternatively, thin iron strips may be placed along the anode surfaces within the magnetic field of the core 6.

The cell is then removed from the water and immersed a second time in the aforementioned electrolyte solution of iron II and iron III chlorides which results in the desired chemical reaction. Periodic addition of iron particles or iron powder from time to time is necessary but is not considered a barrier to practical operation of the fuel cell. The output of the present cell is at least equivalent to that of much more costly and complex fuel cell structures such being achieved in the present cell without the use of costly components. Further, the present fuel cell components are readily available and of a non-dangerous nature, all contributing to the cells highly practical nature.

While the anode above described is shielded, a modified anode may be substituted therefor which anode is a composite of powdered graphite combined with magnetic oxide particles with a pertroleum base binder. In this anode the graphite particles serve as the conductor.

While I have shown but one embodiment of the invention it will be apparent to those skilled in the art that the invention may be embodied still otherwise without departing from the spirit and scope of the ivention.

Having thus described the invention what is desired to be secured under a Letters Patent is:

1. A fuel cell including,
an anode having a magnetic core acting on a metallic fuel,
an electrolyte solution of iron II and iron III chlorides, and
a solid cathode having irregular wall surfaces increasing the wall surface area contactable by the electrolyte, said cathode being of perforate construction additionally defining openings through the cathode permitting circulation of the electrolyte therethrough and efficient electron transfer intermediate the anode and cathode.

2. A fuel cell as claimed in claim 1 wherein said anode includes a permanent magnet and an inert conductor overlying said magnet.

3. The fuel cell as claimed in claim 2 wherein said anode is a composite structure of magnetic oxide particles and graphite with a suitable binder.

4. The fuel cell as claimed in claim 1 wherein said cathode surfaces are characterized by multiple fins extending therealong.

5. The fuel cell as claimed in claim 4, said fins on one cathode surface are in other than parallel relationship to those on the remaining cathode surface.

6. The fuel cell as claimed in claim 5 wherein said fins are defined by grooves in the cathode, said grooves extending inwardly from each cathode surface a distance to intercept grooves in the remaining surface of the cathode thereby forming the openings in the cathode.

* * * * *